United States Patent
Hardigg

[15] 3,690,540
[45] Sept. 12, 1972

[54] SHOCK ISOLATING DEVICE
[72] Inventor: James S. Hardigg, P.O. Box 89, Conway, Mass. 01341
[22] Filed: Feb. 5, 1970
[21] Appl. No.: 9,017

[52] U.S. Cl. ....................229/14, 206/46, 267/141
[51] Int. Cl. ..............................................B65d 25/12
[58] Field of Search........267/141, 153, 140, 145, 63; 206/46 FR; 229/14

[56] References Cited
UNITED STATES PATENTS

| | | |
|---|---|---|
| 3,398,501 | 8/1968 | Aninger................206/46 FR |
| 3,192,978 | 7/1965 | Horvath.................206/46 FR |
| 3,242,964 | 3/1966 | Mosshart et al. .....206/46 FR |

*Primary Examiner*—James B. Marbert
*Attorney*—Cushman, Darby & Cushman

[57] ABSTRACT

A plastic shock isolator element composed of a hollow toroidal-like body wherein its inside circumferential surface merges into a solid integral web centered upon and extending transversely to the axis of the toroidal-like body and its outside circumferential surface has an aperture which communicates with the interior thereof.

19 Claims, 8 Drawing Figures

PATENTED SEP 12 1972 3,690,540

INVENTOR
James S. Hardigg

BY Cushman, Darby & Cushman
ATTORNEYS

PATENTED SEP 12 1972

SHOCK ISOLATING DEVICE

This invention relates to a shock isolator element and to cushioned container units having one or more shock isolator elements incorporated therein.

Fragile articles, for example delicate machinery, instruments, electronic components and the like which are subject to damage by shock, severe vibration or similar forces, are customarily and necessarily packaged in cushioned protective containers.

Typical cushioning devices are disclosed, for instance, in my U.S. Pats. No. 2,859,959; 3,003,622; 3,003,656; 3,283,988 and 3,445,553. While these cushioning devices exhibit favorable dynamic and static performance characteristics, it was found that these characteristics could be retained or improved while at the same time the economic aspects of their manufacture could also be enhanced. As a result, the present invention, which departs considerably from the structural concept of the shock isolator elements shown in these patents, was developed. The shock isolator element of the present invention thus exhibits not only as favorable or better dynamic and static characteristics of my earlier shock isolator elements, but the economics of producing the present shock isolator elements have been significantly improved.

It is therefore a principal object of the present invention to provide a novel shock isolator element which can be utilized to build up cushioned container units with conventional and readily available cartons, such as corrugated fiberboard, wood, metal or plastic containers.

Yet another object of the invention is to provide a shock isolator element exhibiting a unique combination of high shock absorption and static load capacities, adapted to efficiently and effectively protect fragile articles during storage, transportation and drops, which may be either accidental or intentional, as in the case of air drops.

The invention and the novel features thereof can best be made clear by reference to the following description and the accompanying drawings, in which.

Figure 1:
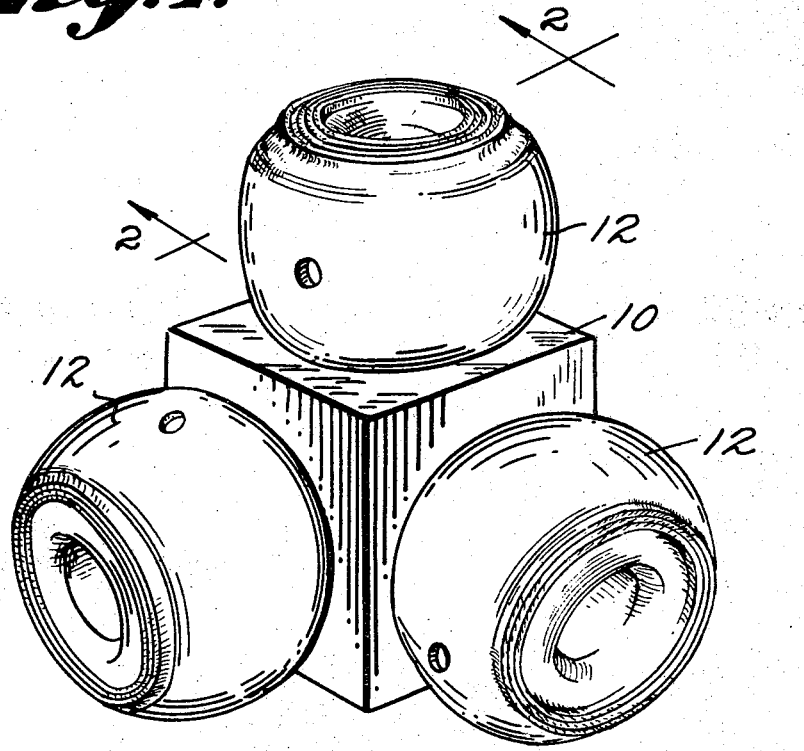
FIG. 1 is a perspective view of an exemplary embodiment of the shock isolator element, ready for incorporation into a container unit to be cushioned.

In the shipping and storage of articles, the articles are frequently subjected to G factors often in excess of 100 or greater, the G factor being an indication of the maximum acceleration a fragile body can withstand without damage. For example, if the G factor of a given article is 50, the article can safely be subjected to an acceleration 50 times that of gravity. Further, during impact the acceleration to which an article is subjected generally varies and the peak acceleration ratio during the impact is termed Gm. The Gm value is valuable in determining the "cushioning factor" which is defined as $$Gm \bigg/ \frac{H}{T}$$

where H is the drop height and T is the cushion thickness. The relationship of the "cushioning factor" to the energy per unit volume impressed on the cushion, which can be expressed as $$\frac{W \times H}{A \times T}$$

where W is weight of articles in pounds, and A is the area under compression, can be determined through the use of accelerometers directly from impact tests of cushioning materials without establishing the stress strain curve.

Materials having a low minimum $$Gm \bigg/ \frac{H}{T}$$

value are advantageously employed as cushioning materials. While the cushioning materials of the prior art such as foamed bodies provided with elastomeric columns provided favorable dynamic and static performance characteristics, the present invention provides equally favorable or better performance characteristics and is more economical to produce.

GENERAL DESCRIPTION

The shock isolator element of the present invention, broadly defined, is one which is characterized in that it possesses an appreciable degree of resistance to compressional forces and on deformation restores itself to essentially its original shape. The isolator element has spaced end walls and an intervening smooth side wall. The end walls are relatively movable toward and away from each other between a position of wide separation wherein the sidewall has a dimension corresponding to its dimension in the undeformed state and a position of close proximity wherein the sidewall is collapsed. Additionally, the sidewall forms a continuous circular surface which, preferably, is outwardly convex. Also preferably an aperture is provided in the side wall of the shock isolator element which aperture communicates with the interior thereof.

The shock isolator element of the present invention comprises a hollow toroidal-like body, the inside circumferential surface of which merges into a solid integral web centered upon and extending transversely to the axis of the toroidal-like body. The outside circumferential surface of the toroidal-like body has an aperture communicating with the interior of the shock isolator element.

Preferably, the outside circumferential surface of the shock isolator element of this invention is curved thereby providing more favorable recovery characteristics after impact than a substantially straight walled cylindrical configuration.

The ratio of thickness of the shock isolator element to its maximum diameter can vary from about 0.33 to 0.66 although it will be appreciated that a ratio smaller or greater can also be employed.

Further, the ratio of the diameter of the solid integral web formed from the inside circumferential surface of the hollow toroidal-like body to the thickness of the shock isolator element can vary between about 0.25 to about 0.85, while the ratio of the diameter of the solid integral web to the maximum diameter of the shock isolator element can preferably vary between about 0.16 to about 0.28, the maximum diameter of the shock isolator element being dependent upon the use to which the shock isolator element is put. Conveniently, shock isolator elements having a maximum diameter ranging from about 2 inches to about 1 foot are preferred but elements with a larger maximum diameter can be provided, for instance, when the element is employed as a landing attachment for helicopters.

The shock isolator element of this invention can be made of any suitable synthetic thermoplastic material and preferably from polyvinyl chloride, polyurethane, polyethylene or polyethylene-EVA copolymers which copolymers, for instance, can have a ratio of the respective monomer ranging generally from about 90:10 to 10:90. Generally, any conventional thermoforming process can be employed to produce the shock isolator elements of this invention, although it has been found particularly advantageous to employ a blow molding technique in view of its ready susceptibility to mass-production operations. The wall thickness of the shock isolator element of this invention is substantially uniform throughout except at the integral web portion thereof which can be up to about twice the wall thickness of the remainder. It has been found practical to provide a wall thickness ($t$) which is related to the maximum diameter ($D$) of the shock isolator element by the following relationship. ($t/D$) is equal approximately to a value ranging between about 0.007–0.03 and, preferably, between about 0.01–0.02. In many instances a convenient value for the ratio of ($t/D$) has been found to be about 0.012. It will be recognized, however, that this value can vary slightly depending, for instance, on the particular material employed to produce the shock isolator element as well as the ultimate use to which the element is put.

The following table illustrates the variance of the aperture size relative to such variables. Conveniently, when the shock isolator element has a maximum diameter ranging from about 2–12 inches, and a thickness ranging from about 1–3 inches, the aperture can have a diameter up to about 0.312 inch.

The shock isolator element of this invention can be affixed or attached to any suitable backing member by any convenient means such as by an adhesive or by mechanical fastening means such as rivets, screws, nails or staples. Preferably, however, the shock isolator is attached to a compatible backing member by conventional spin welding techniques although other heat welding processes can also be employed. When a spin welding technique is employed in assembling the shock isolator element to a backing member, at least the outer surface of the shock isolator element to be attached to the backing member is preferably provided with at least one circular groove centered on the axis of the toroidal-like body, the said surface being substantially tangent to a plane normal to the axis of said body although it will be recognized that a grooveless surface can also usefully be employed. It has further been found that even more desirable results can be achieved when a plurality of concentrically disposed grooves are provided.

Alternatively, a secondary backing member can be provided with an aperture into which the shock isolator assembly comprising the shock isolator element of this invention in association with a primary backing member can be inserted and retained therein by interlocking engagement with the secondary backing member. Conveniently a sun-burst type opening in the secondary backing member can be utilized which provides sufficient engagement with the shock isolator assembly to retain the latter even under relatively severe transportation conditions.

SPECIFIC DESCRIPTION

The shock isolator element of this invention may be made more clear by referring to the drawings wherein, in FIG. 1 there is shown a three-faced, corner-shaped backing sheet 10, composed, for instance, of polyethylene having attached to each of the three faces thereof a shock isolator element 12.

Each of said shock isolator elements 12 comprises a plastic, hollow, toroidal-like body, the inside circumferential surface 14 of which merges into the solid integral web 16 centered upon and extending transversely to the axis 18 (in dotted line) of the toroidal-like body. The outside circumferential surface 20 of the toroidal-like body is provided with an aperture 22.

Preferably, the outside circumferential surface 20 is curved, and not of a straight wall configuration.

Figure 2:
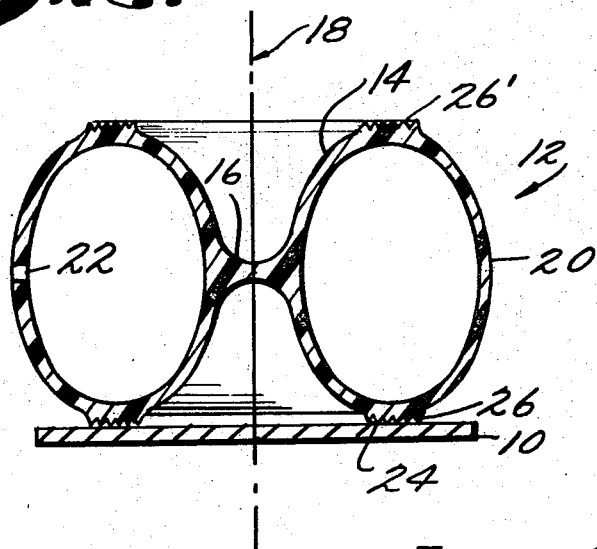
FIG. 2 is a sectional view taken on the line 2—2 of FIG. 1.
Figure 4:
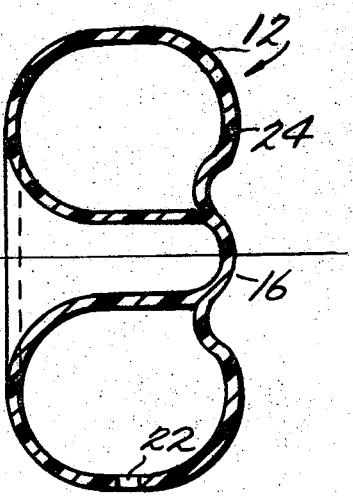
FIG. 4 is a sectional view taken on the line 4—4 of FIG. 3.

As can be seen in FIG. 2, the solid integral web 16 lies on a mid-plane passing through the toroidal-like body 12 and is substantially normal to the axis 18 thereof. Alternatively, the solid integral web 16 can be substantially coplanar with an outside surface 24 of the toroidal-like body, which outside surface 24 lies in a plane which is substantially normal to the axis 18 of the toroidal-like body, as seen in FIG. 4.

TABLE
Peak acceleration (gm.)

| Orifice size (inches) | 18" Load (lbs.) 1 set of 4 pads | | | | | 24" Load (lbs.) 1 set of 4 pads | | | | | 30" Load (lbs.) 1 set of 4 pads | | | | | 36" Load (lbs.) 1 set of 4 pads | | | | |
|---|---|---|---|---|---|---|---|---|---|---|---|---|---|---|---|---|---|---|---|---|
| | 30 | 40 | 50 | 60 | 70 | 30 | 40 | 50 | 60 | 70 | 30 | 40 | 50 | 60 | 70 | 30 | 40 | 50 | 60 | 70 |
| Sealed | 45 | 36 | 32 | 29 | 27 | 48 | 40 | 36 | 35 | 33 | 49 | 47 | 45 | 45 | 44 | 58 | 51 | 49 | 51 | 55 |
| 1/8 | 44 | 35 | 31 | 29 | 27 | 46 | 39 | 35 | 33 | 32 | 47 | 44 | 42 | 39 | 39 | 55 | 49 | 45 | 46 | 53 |
| 3/16 | 43 | 34 | 29 | 26 | 24 | 43 | 38 | 34 | 32 | 31 | 43 | 41 | 38 | 36 | 37 | 52 | 46 | 42 | 42 | 45 |
| 1/4 | 40 | 33 | 29 | 26 | 23 | 43 | 37 | 33 | 30 | 29 | 44 | 39 | 36 | 34 | 34 | 53 | 43 | 40 | 41 | 46 |
| 5/16 | 39 | 32 | 28 | 24 | 22 | 45 | 35 | 30 | 26 | 24 | 48 | 42 | 35 | 32 | 33 | 50 | 43 | 38 | 42 | 50 |
| 3/8 | 38 | 32 | 27 | 24 | 22 | 39 | 36 | 31 | 27 | 27 | 42 | 39 | 38 | 45 | 31 | 45 | 40 | 46 | >60 | 52 |

NOTE.—Pad size 3" diameter x 2" thick; pad weight 22.5 grams; pad made of low density polyethylene.

The shock isolator element shown in FIGS. 1 and 2 was constructed of polyethylene in a blow-molding operation and had the following dimensions: 1.5 inches thick, 3 inches in maximum diameter with an integral web located at the midplane thereof. The integral web had a diameter measuring substantially one-half inch. The shock isolator element 12 was attached to the backing member, also made of polyethylene, by a conventional heat welding operation.

To facilitate the assembly of the shock isolator element 12 to the backing member 10 by any convenient heat welding operation, such as a spin-welding technique, the outer surface 24 is provided with a plurality of circular grooves 26 which are centered on the axis 18 of the toroidallike body member. While a plurality of grooves 26 are shown, it will be apparent that as few as one groove 26 can be provided or more than five as shown in this Figure. Also it is possible to provide one or more grooves 26' on the corresponding but opposed surface 24', if desired. The grooves 26 have been found to improve the bond between the shock isolator element 12 and the backing member 10, especially when the bond is effected by a spin-welding technique.

Figure 3:
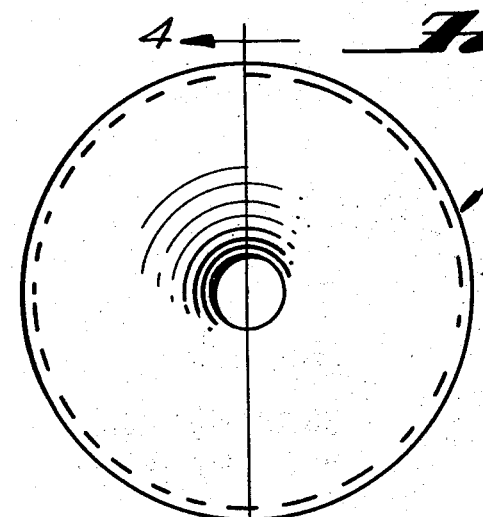
FIG. 3 is a plan view of another embodiment of the shock isolator element of the present invention.

The shock isolator element 12 shown in FIGS. 3 and 4 was also constructed of polyethylene in essentially the same manner as that used to produce the shock isolator element shown in FIGS. 1 and 2. In this embodiment, however, the shock isolator element has a maximum diameter of 3 inches, a thickness of 1.5 inches, the diameter of the integral web 16 being substantially one-half inch. The integral web 16 is substantially coplanar with the outside surface 24 which, in turn, lies in a plane which is substantially normal to the axis 18. This embodiment lends itself to attachment to a suitable backing member by mechanical means such as nails, screws, rivets, staples and the like although certainly conventional heat welding techniques can also be usefully employed to effect such attachment.

Figure 5:
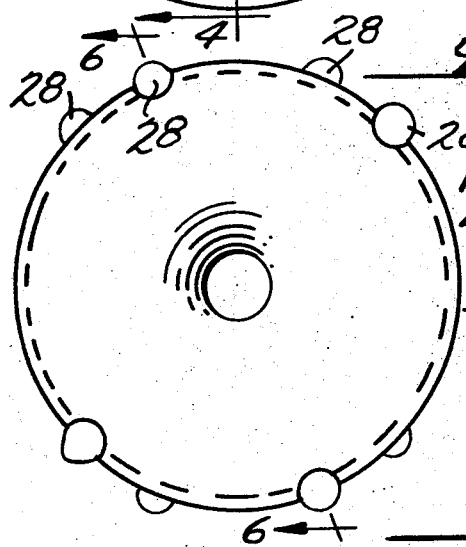
FIG. 5 is a plan view of another embodiment of the shock isolator element of the present invention.
Figure 6:
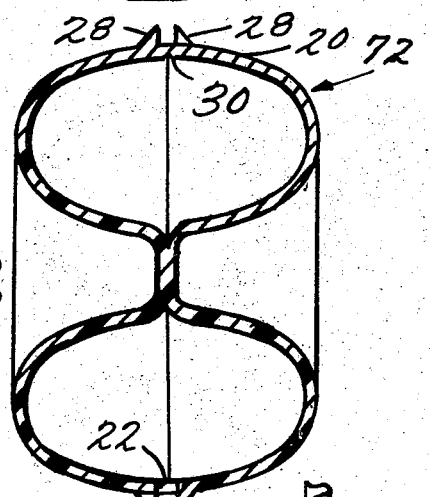
FIG. 6 is a sectional view taken on the line 6—6 of FIG. 5.

The shock isolator element 12 shown in FIGS. 5 and 6 was also constructed of polyethylene in much the same manner as the shock isolator element shown in FIGS. 1 and 2. However, the shock isolator element illustrated in FIGS. 5 and 6 is provided on the outside circumferential surface 20 with a plurality of spaced projections 28. A portion of said spaced projections lies in one plane passing through said toroidal-like body slightly above the mid-plane thereof and normal to the axis thereof while another substantially equal portion of said spaced projections lies on a second plane passing through said toroidal-like body slightly below the said mid-plane, which plane is also normal to the axis thereof. In engagement with circumferential band 30 defined by the circumferential area between the projections lying on one plane and the projections lying on said second plane is a backing member provided with an aperture having a size corresponding essentially to the maximum diameter of said toroidal-like body which is held in place by further engagement with said projections. Obviously, the thickness of the backing member chosen will determine the width of the band 30 and hence the placement of the projections 28 on said outside circumferential surface 20.

Figure 7:
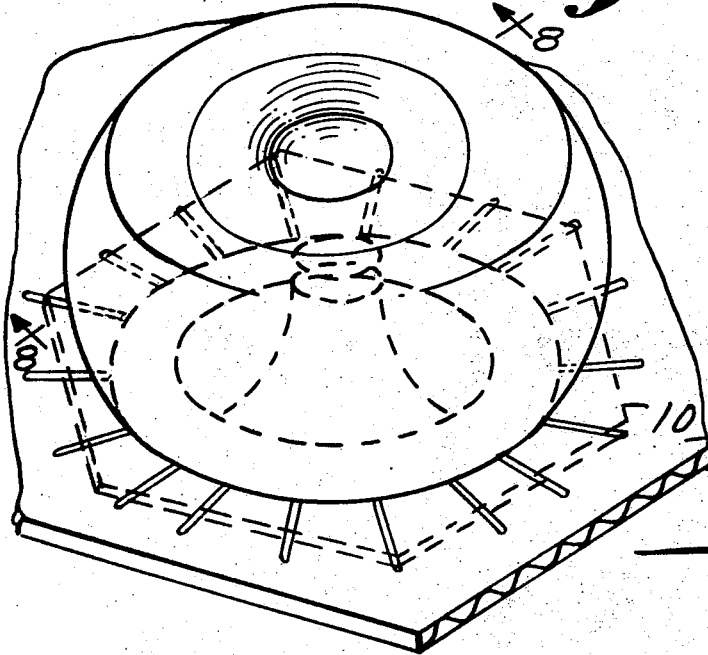
FIG. 7 is a perspective view of another embodiment of the present invention.
Figure 8:
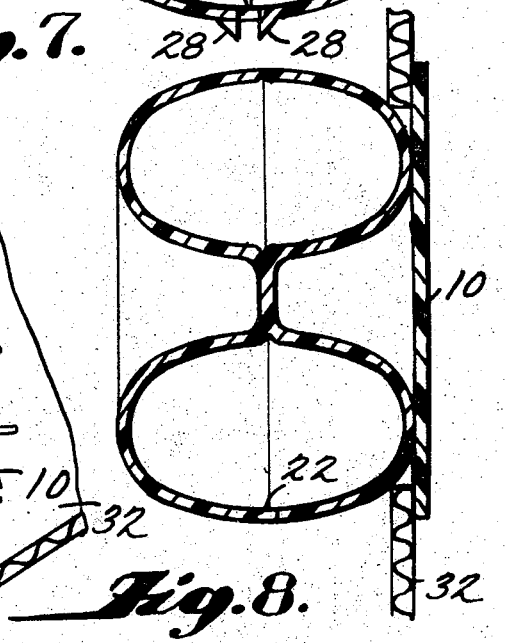
FIG. 8 is a sectional view taken on the line 8—8 of FIG. 7.

The shock isolator element 12 shown in FIGS. 7 and 8 is also constructed of polyethylene in essentially the same manner as the shock isolator elements shown in FIGS. 1 and 2. A resilient backing member 10 which can be hexagonal in shape is affixed thereto by a conventional spin-welding technique. The resilient hexagonal shaped backing member will generally have a diameter larger than that of the toroidal-like body, and the assembly can be secured in place in a secondary or auxiliary backing member 32 which can be made, for instance, of corrugated fiberboard or sheet by providing in the secondary backing member an aperture, the maximum size of which will be less than the diameter of the hexagonal shaped backing member and less than the diameter of the toroidal-like body member. The resilient backing member is fitted into the aperture so that that portion of the secondary backing member, defined by the aperture, interlockingly engages both the backing member and the circumferential surface of said toroidal-like member. As can be seen in FIG. 7, the aperture is in the form of a sun-burst die-cut and the secondary backing member can be in the form of a generally L-shaped section or any other convenient form or shape of corrugated fiberboard or any other convenient material which can be folded and secured into the corner-shaped device shown in FIG. 1, with each face of the corner being provided with a similar aperture in which an essentially similar isolator assembly is secured.

In another embodiment of the present invention, the ratio of the diameter of the integral web to the maximum diameter was increased and the resulting shock isolator element more nearly resembled a toroidal-like body generated from a circle than the shock isolator elements of FIGS. 1 and 2 which resemble a toroidal-like body generated from an ellipse. Nonetheless, this variation, due to an increase in the ratio of the diameter of the integral web to the maximum diameter of the toroidal-like body, exhibited quite favorable dynamic and static characteristics as well as an acceptable recover of its initial shape following impact.

The number of shock isolator elements of the present invention used to provide a cushioned shipping container can vary widely and will depend on the nature and the size of the article being shipped as well as the anticipated forces to which the article will be subjected during shipping or handling. Thus, in some instances, it may be necessary to use as many as 24 individual shock isolator elements where an article packaged in an inner rectangular container is provided with an outer container. Each face of the inner container will be provided with four shock isolator elements to make a rotationally stable configuration, thereby accommodating all directions of impact. In other situations, not all faces of the container to be cushioned need be provided with four shock isolator elements and as few as one shock isolator element on a face of the container can provide adequate protection.

It will also be appreciated that the shock isolator element of the present invention can be employed in a manner other than in combination with an inner and outer container assembly. Thus, the shock isolator element can be positioned beneath large units that are shipped on skids or pallets or they can be affixed to the ends of freight cars to reduce impact forces when such cars are humped. They can also usefully be attached to, or form a part of, automobile bumpers as an improvement over conventionally employed polyurethane molded bumper covers. Additionally, dashboard crash pads on automobiles can be underlain with an assembly of the shock isolator elements of the present invention. Relatively large shock isolator elements can be used in combination with conventional landing gear components for helicopters, for instance, to reduce the overall weight of the helicopter which is especially desireable when the surface on which the helicopter is to land can safely support only a limited load. Still other areas where the shock isolator element of the present invention can be used include the production of crash helmets where a plurality of relatively small shock isolator elements can form an inner liner for the helmet.

It is claimed:

1. A plastic shock isolator element comprising a hollow toroidal-like body having spaced end walls and an intervening smooth side wall with the inside circumferential surface of said body merging into a solid integral web centered upon and extending transversely to the axis of said toroidal-like body, said element possessing an appreciable degree of resistance to compressional forces and on deformation restores itself to essentially its original shape, said end walls being relatively movable toward and away from each other between a position of wide separation wherein the side wall has a dimension corresponding to its dimension in the undeformed state and a position of close proximity wherein the side wall is collapsed.

2. The plastic shock isolator element of claim 1 wherein its intervening smooth side wall has an aperture communicating with the interior of said body.

3. The plastic shock isolator element of claim 1 wherein said intervening smooth side wall is curved.

4. The plastic shock isolator element of claim 1 made of low density polyethylene.

5. The plastic shock isolator element of claim 1 wherein the solid integral web lies on a mid-plane passing through said toroidal-like body normal to the axis thereof.

6. The plastic shock isolator element of claim 1 wherein the solid integral web is substantially coplanar with an end wall of said toroidal-like body, said end wall lying in a plane which is substantially normal to the axis of said toroidal-like body.

7. The plastic shock isolator element of claim 2 wherein the aperture in the intervening smooth side wall is located on a mid-plane passing through said toroidal-like body normal to the axis thereof.

8. The plastic shock isolator element of claim 1 wherein at least one end wall of said toroidal-like body is provided with a circular groove centered on the axis of said toroidal-like body, said end wall being substantially tangent to a plane normal to the axis of said body.

9. The plastic shock isolator element of claim 8 wherein a plurality of concentrically disposed grooves is provided.

10. The plastic shock isolator of claim 9 wherein each of said end walls is provided with a plurality of said concentrically disposed grooves.

11. The plastic shock isolator element of claim 1 including a backing sheet attached thereto substantially normal to the axis of said toroidal-like body.

12. A cushioned shipping container unit comprising an outer container adapted to receive an article to be cushioned and a plurality of plastic shock isolator elements adapted to completely space said article from said outer container, each of said plastic shock isolator elements comprising a hollow toroidal-like body having spaced end walls and an intervening smooth side wall with the inside circumferential surface of said body forming a solid integral web centered upon and extending transversely to the axis of said toroidal-like body, said element possessing an appreciable degree of resistance to compressional forces and on deformation restores itself to essentially its original shape, said end walls of each element being relatively movable toward and away from each other between a position of wide separation wherein their associated side wall has a dimension corresponding to its dimension in the undeformed state and a position of close proximity wherein said side wall is collapsed.

13. The cushioned shipping container of claim 12 wherein the intervening side wall of each of said toroidal-like bodies is provided with an aperture.

14. The cushioned shipping container unit of claim 12 wherein the plastic shock isolator element is made of low density polyethylene.

15. A hollow plastic shock isolator element which is characterized in that it possesses an appreciable degree of resistance to compressional forces and on deformation restores itself to essentially its original shape comprising spaced end walls and an intervening smooth side wall having an aperture communicating with the interior of said isolator element, said end walls being relatively movable toward and away from each other between a position of wide separation wherein the side wall has a dimension corresponding to its dimension in the undeformed state and a position of close proximity wherein the side wall is collapsed.

16. The hollow plastic shock isolator element of claim 15 wherein the side wall forms a continuous circular surface.

17. The hollow plastic shock isolator element of claim 16 wherein the continuous circular surface is outwardly convex.

18. A plastic shock isolator element comprising a hollow toroidal-like body, the outside circumferential surface of said toroidal-like body having an aperture communicating with the interior of said body.

19. The plastic shock isolator element of claim 18 wherein the outside circumferential surface is curved.

* * * * *